(12) United States Patent
Zhou et al.

(10) Patent No.: US 12,106,231 B2
(45) Date of Patent: Oct. 1, 2024

(54) METHOD AND APPARATUS FOR PREDICTIVE CALCULATION OF PLANT WATER NEED

(71) Applicant: Enviro Networks, Inc., San Jose, CA (US)

(72) Inventors: Huawei Zhou, Saratoga, CA (US); Hongying Yu, Saratoga, CA (US)

(73) Assignee: Enviro Networks, Inc., San Jose, CA (US)

( * ) Notice: Subject to any disclaimer, the term of this patent is extended or adjusted under 35 U.S.C. 154(b) by 797 days.

(21) Appl. No.: 17/333,833

(22) Filed: May 28, 2021

(65) Prior Publication Data

US 2022/0383155 A1    Dec. 1, 2022

(51) Int. Cl.
| | |
|---|---|
| *G06N 5/04* | (2023.01) |
| *A01G 25/16* | (2006.01) |
| *G06F 16/23* | (2019.01) |
| *G06N 20/00* | (2019.01) |

(52) U.S. Cl.
CPC ............... *G06N 5/04* (2013.01); *A01G 25/16* (2013.01); *A01G 25/167* (2013.01); *G06F 16/2379* (2019.01); *G06N 20/00* (2019.01)

(58) Field of Classification Search
CPC .......... G06N 5/04; G06N 20/00; A01G 25/16; A01G 25/167; G06F 16/2379; G06Q 10/04; G06Q 50/02
See application file for complete search history.

(56) References Cited

U.S. PATENT DOCUMENTS

| | | | |
|---|---|---|---|
| 7,882,109 B2 * | 2/2011 | Lassalle ................ | G06F 16/322 707/741 |
| 10,505,483 B2 * | 12/2019 | Zhou ........................ | H02K 7/09 |
| 10,574,164 B2 * | 2/2020 | Zhou ........................ | H02P 21/22 |
| 11,159,113 B2 * | 10/2021 | Zhou ..................... | H02P 29/028 |
| 2008/0288116 A1 * | 11/2008 | Nickerson .............. | A01G 25/16 700/284 |
| 2011/0137827 A1 * | 6/2011 | Mason, Sr. ............ | G06Q 10/06 702/182 |
| 2015/0276238 A1 * | 10/2015 | Matsuoka ........... | H04L 12/2816 700/278 |
| 2019/0006973 A1 * | 1/2019 | Zhou ................... | H02P 29/0243 |
| 2019/0229666 A1 * | 7/2019 | Zhou .................... | H02K 41/033 |
| 2020/0214231 A1 * | 7/2020 | Beeri ................... | A01G 25/165 |

(Continued)

*Primary Examiner* — Ramesh B Patel
(74) *Attorney, Agent, or Firm* — Jingming (James) Cai; SAC Attorneys LLP (57) ABSTRACT

A plant water need computing system and method for forecasting water need to optimize irrigation efficiency while ensuring that a plant grows at optimal water availability. The plant water need computing system and method use a computational input and output balance model (CIOB model) implemented on a server to calculate irrigation need (IR) predictively. The CIOB model is implemented as a service through a representational state transfer application program interface (REST API). Registered clients get access to the API through a client application. Field identifier is passed by the client application to the CIOB model in an API request. The CIOB model sends an API response to the client application. The API response comprises irrigation need (IR). The CIOB model uses a computational module to calculate the IR and uses machine learning to optimize the plant water need.

25 Claims, 8 Drawing Sheets

(56) References Cited

U.S. PATENT DOCUMENTS

| | | | |
|---|---|---|---|
| 2021/0059136 A1* | 3/2021 | Hill | A01G 25/167 |
| 2021/0067077 A1* | 3/2021 | Zhou | H02P 29/032 |
| 2022/0304262 A1* | 9/2022 | Ciarletti | A01G 25/16 |
| 2022/0383155 A1* | 12/2022 | Zhou | A01G 25/167 |

* cited by examiner

| Date | High Temp (C) | Low Temp (C) | High Humidity (%) | Low Humidity (%) | High Atmospheric Pressure (kpal) | Low Atmospheric Pressure (kpal) | High Wind Speed (m/s) | Low Wind Speed (m/s) | Solar Radiation (MJ/m2/day) | SWRp (mm) | SWRi (mm) | Pp (mm) | Pn (mm) | ET (mm) | SR (mm) | DP (mm) | IR (mm) |
|---|---|---|---|---|---|---|---|---|---|---|---|---|---|---|---|---|---|
| 2021-03-01 | 20 | 3 | 79 | 26 | 102.3 | 102 | 10 | 2 | 16.819 | 10 | 10 | 0 | 0 | 2.166 | 0 | 0 | 2.166 |
| 2021-03-02 | 22 | 5 | 75 | 21 | 102.2 | 101.7 | 9 | 2 | 17.006 | 10 | 10 | 0 | 0 | 2.524 | 0 | 0 | 2.524 |
| 2021-03-03 | 21 | 4 | 75 | 25 | 101.7 | 101 | 7 | 1 | 16.308 | 10 | 10 | 0 | 0 | 2.182 | 0 | 0 | 2.182 |
| 2021-03-04 | 19 | 5 | 92 | 37 | 101.8 | 100.8 | 9 | 1 | 15.916 | 10 | 10 | 0 | 0 | 1.736 | 0 | 0 | 1.736 |
| 2021-03-05 | 20 | 4 | 100 | 36 | 102.5 | 101.9 | 9 | 2 | 17.528 | 10 | 10 | 0 | 0.6 | 1.589 | 0 | 0 | 0.989 |
| 2021-03-06 | 19 | 5 | 100 | 37 | 102.5 | 101.7 | 8 | 2 | 17.600 | 10 | 10 | 0.6 | 0 | 1.637 | 0 | 0 | 1.037 |
| 2021-03-07 | 17 | 6 | 96 | 46 | 102.2 | 101.9 | 11 | 2 | 17.741 | 10 | 10 | 0 | 0 | 1.721 | 0 | 0 | 1.721 |
| 2021-03-08 | 17 | 2 | 100 | 43 | 102.1 | 101.8 | 10 | 1 | 17.953 | 10 | 10 | 0 | 1.2 | 1.441 | 0 | 0 | 0.241 |
| 2021-03-09 | 16 | 2 | 92 | 41 | 102.5 | 101.9 | 10 | 2 | 16.848 | 10 | 10 | 1.2 | 1 | 1.651 | 0 | 0 | -0.549 |
| 2021-03-10 | 14 | 4 | 96 | 53 | 102.4 | 101.6 | 10 | 2 | 11.426 | 10 | 10 | 1 | 0 | 1.308 | 0 | 0 | 0.308 |
| 2021-03-11 | 12 | 5 | 96 | 59 | 101.7 | 101.3 | 9 | 2 | 13.018 | 10 | 10 | 0 | 0 | 1.310 | 0 | 0 | 1.310 |
| 2021-03-12 | 14 | 3 | 100 | 45 | 102 | 101.6 | 10 | 1 | 18.540 | 10 | 10 | 0 | 0 | 1.530 | 0 | 0 | 1.530 |
| 2021-03-13 | 19 | 3 | 100 | 33 | 102.4 | 101.9 | 10 | 2 | 18.925 | 10 | 10 | 0 | 2 | 1.794 | 0 | 0 | -0.206 |
| 2021-03-14 | 17 | 3 | 100 | 50 | 102.7 | 102.4 | 11 | 1 | 18.421 | 10 | 10 | 2 | 1.1 | 1.559 | 0 | 0.09 | -1.451 |
| 2021-03-15 | 16 | 3 | 97 | 53 | 102.7 | 101.9 | 13 | 0 | 10.338 | 10 | 10 | 1.1 | 0 | 1.313 | 0 | 0 | 0.213 |
| 2021-03-16 | 12 | 4 | 89 | 47 | 101.9 | 101.5 | 21 | 2 | 15.664 | 10 | 10 | 0 | 0 | 1.923 | 0 | 0 | 1.923 |
| 2021-03-17 | 15 | 2 | 96 | 40 | 102 | 101.6 | 9 | 1 | 19.656 | 10 | 10 | 0 | 3.1 | 1.798 | 0 | 0 | -1.302 |
| 2021-03-18 | 16 | 3 | 96 | 46 | 102 | 101.6 | 8 | 1 | 17.554 | 10 | 10 | 3.1 | 1.4 | 1.746 | 0 | 0.9 | -1.854 |
| 2021-03-19 | 17 | 5 | 96 | 48 | 102 | 101.6 | 7 | 2 | 15.970 | 10.1 | 10 | 1.4 | 0 | 1.804 | 0 | 0 | 0.304 |
| 2021-03-20 | 16 | 9 | 97 | 56 | 102.4 | 102 | 8 | 2 | 15.451 | 9.4 | 10 | 0 | 0 | 1.884 | 0 | 0 | 2.484 |
| 2021-03-21 | 16 | 7 | 93 | 46 | 102.3 | 101.7 | 11 | 2 | 19.796 | 10 | 10 | 0 | 0 | 2.295 | 0 | 0 | 2.295 |

Plant: Broccoli, Growth Stage: Development, City: San Jose, CA, Latitude: 37.315759, Longitude: -121.97365. The target time is 1PM on each of the dates. Negative IR value means there is water surplus and the irrigation volume would be 0.

FIG. 8

METHOD AND APPARATUS FOR PREDICTIVE CALCULATION OF PLANT WATER NEED

BACKGROUND

The disclosure recited herein relates to a method and an apparatus for calculating plant water need predictively. More specifically, the present inventive concept discloses a method and a system for calculating the water requirement for plants, to optimize irrigation efficiency and to ensure the optimal plant growth at optimal irrigation water feed. The plant water need is herein referred to as irrigation need.

The world is facing an increasingly severe water shortage. Agricultural irrigation which accounts for 70% of total water usage is only 30-40% efficient. Water shortage causes reduced crop production which results in food shortage in some areas. There have been some initiatives in improving irrigation efficiency.

Most smart irrigation controllers rely on the rain forecast in weather data to turn the irrigation system on and off. However, rain forecast is often inaccurate due to the inability of the forecast to predict whether a rain event would occur or not, the amount of rain, and the duration of the rain. Therefore, such smart irrigation controllers can result in over watering or under watering of plants, resulting in damage to the plants.

Several smart irrigation controllers use soil moisture data from sensors in a field to determine irrigation time and frequency. However, sensor data may not reflect the water content in the actual field, and it does not reflect the correlation with the water need of the plant.

Existing irrigation systems comprise a number of non-local data sources. The irrigation system comprises a processor configured to receive data from one or more of the non-local data sources for calculating an evapotranspiration (ET) value for an irrigation area that is non-local with respect to the non-local data sources. In other instances, the evapotranspiration (ET) rate of the plant is measured and calculated with or without measuring devices in the field. Evapotranspiration (ET) calculation is based on academic research which may be interpreted differently when used with environmental factors in the calculation. An evapotranspiration (ET) calculation does not accurately reflect actual water loss by evapotranspiration. Therefore, an irrigation controller based on evapotranspiration (ET) may have wide fluctuation in irrigation decisions.

Furthermore, existing systems have software and hardware that are only compatible with their own equipment and are not applicable to other systems outside of their own.

Therefore, there is a need for a method and apparatus for calculating plant water need that establishes a water balance model based on the relationship between the plant, water and soil. Furthermore, there is a need for a water balance model that makes computational forecast of an irrigation need based on weather data, public data, and measurable data. Furthermore, there is a need for a machine learning system to self-improve the quality of an irrigation decision.

SUMMARY OF THE INVENTION

This summary is provided to introduce a selection of concepts in a simplified form that are further disclosed in the detailed description of the invention. This summary is not intended to determine the scope of the claimed subject matter.

The plant water need computing system and method disclosed herein address the above recited need for a method and apparatus for calculating plant water need that establishes a water balance model relying on the relationship between plant, water and soil. The plant water need computing system and method disclosed herein also address the need for a water balance model that makes computational forecast of irrigation need based on weather data, public data, and measurable data. Furthermore, the plant water need computing system and method disclosed herein also address the need for machine learning to self-improve the quality of an irrigation decision.

The plant water need computing system and method disclosed herein uses plant physiology, soil and field data, weather data, geographic data and sensor data to calculate the water consumption rate by a plant and forecasts water need, which optimizes irrigation efficiency while ensuring the plant grows at optimal water availability.

According to the Food and Agriculture Organization of the United Nations, one of the major concerns in irrigation is poor efficiency, i.e., an inadequate utilization of water fed to the plant. An estimate is that about 40 percent or more of the water used for irrigation is wasted at the farm level through either deep percolation or surface runoff due to over watering; see Chapter I—"The Practice of Irrigation" in "Guidelines For Designing And Evaluating Surface Irrigation Systems" by W. R. Walker published in 1989.

Understanding the relationship between soil, water and plant improves water efficiency for irrigation. In the plant water need computing system and method disclosed herein, a computational input and output balance model (CIOB model) is disclosed to calculate irrigation need predictively.

CIOB model. Precipitation (Pp, Pn) and irrigation water volume (I) provide water to meet a plant's water requirement. (Pp, Pn) are water intake in a field water balance equation. The field water balance equation is used to compute an irrigation need (IR). Precipitation (Pp, Pn) may come before or after intended irrigation time. Precipitation within a certain amount of time (P hours) before the intended irrigation time is Pp. Precipitation within a certain amount of time (N hours) after the intended irrigation time is Pn. Precipitation (Pp, Pn) and irrigation water volume (I) can be lost by surface runoff (SR) and deep percolation (DP).

A plant absorbs water from soil through its roots. The majority of the irrigation water is lost to the atmosphere through evaporation from leaf surfaces and transpiration through stomata of leaves. This water movement is called evapotranspiration (ET) in plant physiology. Evapotranspiration (ET) is the fundamental water requirement for the healthy growth of a plant.

Evapotranspiration (ET), surface runoff (SR) and deep percolation (DP) are the variables representing water output in the CIOB model.

Effective water input (Precipitation (Pp, Pn)) after excluding surface runoff and deep percolation is held in the soil before it is consumed by a plant. The water stored in the soil serves as a reserve to balance water input and output dynamically. This is referred to as soil water reserve (SWR).

The plant water need computing system comprises a server. The server comprises a memory unit comprising computer program instructions defined by modules of the plant water need computing system. The server further comprises at least one processor communicatively coupled to the memory unit for executing the computer program instructions defined by the modules of the plant water need computing system. The modules of the plant water need computing system comprise a computational input and output balance (CIOB) module comprising the computational input and output balance model (CIOB model). The CIOB model receives field identifier from a client application on a client device in an application program interface (API) request. The CIOB model sends an application program interface (API) response to the client application. The application program interface (API) response comprises calculated irrigation need (IR).

The plant water need computing system further comprises an application program interface (API) for receiving the application program interface (API) request from the client application on the client device in communication with the server apparatus. The application program interface (API) sends the application program interface (API) response to the client application on the client device. The API response comprises the computed irrigation need (IR).

The method for computing plant water need comprises providing the plant water need computing system, calculating soil water reserve (SWR) based on inputs from soil water sensors, and calculating the irrigation need (IR).

The irrigation need (IR) of the plant is then calculated by the formula:

$$IR=SWRi-SWRp-Pp-Pn+ET+SR+DP$$

where irrigation need is water need at the intended irrigation time, SWRi is the soil water reserve at the scheduled irrigation time Tsi, SWRp is the soil water reserve P hours before the scheduled irrigation time Tsi, Pp is precipitation P hours before the scheduled irrigation time Tsi, Pn is the precipitation N hours after the scheduled irrigation time, ET is the plant evapotranspiration rate between current time T0 and the scheduled irrigation time Tsi, SR is water runoff from the soil surface between the current time T0 and the scheduled irrigation time Tsi, and DP is the soil deep percolation between the current time T0 and the scheduled irrigation time Tsi.

Affecting Factors and Variables. Each variable in the irrigation need formula is affected by one or more factors.

SWRi and SWRp: The water balance in the soil is dependent on the water-holding capacity of the soil which is determined by soil type (ST). Each soil type has its own physical characteristics which include soil composition, soil texture, soil structure, bulk density and soil porosity. SWR should be maintained between field water capacity (FWC) and permanent wilting point (PWP). FWC and PWP represent the upper limit and lower limit of water in the soil respectively. In the method and system disclosed herein, the optimal soil water is not simply set to FWC. Instead, it is set based on aggregated data source such as plant physiological attributes and local environmental factors.

Pp and Pn: The precipitation level varies by geographical region (GR) and season (SC). Pp is precipitation P hours before the intended irrigation time, and Pn is precipitation N hours after the intended irrigation time. Pn is partially claimed as water input in irrigation need calculation. If rain is forecast N hours after the intended irrigation time, the irrigation is skipped, or irrigation water volume is reduced to make use of the near-future rain water.

ET: Evapotranspiration is affected by many factors which include the following.

Plant Type (PT)—Each plant has its own physiology, and therefore has its own evapotranspiration rate.

Growth Stage (GS)—Root depth and evapotranspiration (ET) level varies in a plant's life cycle. Water use of most plants increases from germination to vegetative growth, peaks at reproduction season, and decreases at maturity and senescence.

Season Change (SC)—In general, a plant has a lower water need in winter, and a higher water need in summer.

Climate Conditions (CC)—Climate conditions such as temperature (T), humidity (H), wind speed (W), radiation (R) affect evapotranspiration (ET) level.

SR: Soil surface runoff is affected by soil type (ST) and field topography (FT). The faster the soil absorbs water, the less runoff. If the field is sloped, the steeper the slope is, the more the runoff. In an optimized irrigation, soil surface runoff is minimal and can be ignored. Soil surface runoff is also used as a parameter to adjust calculation when the field feedback suggests discrepancy to the water balance equation in this invention.

DP: The amount of water that percolates into deep soil is determined by soil type (ST). In an optimized irrigation, soil deep percolation is minimal and can be ignored. Soil deep percolation is also used as a parameter to adjust calculation when the field feedback suggests discrepancy to the water balance equation in the method and system disclosed herein.

BRIEF DESCRIPTION OF DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific components disclosed herein. The description of a component referenced by a numeral in a drawing is applicable to the description of that component shown by that same numeral in any subsequent drawing herein.

FIG. 8 exemplarily illustrates experimental data showing irrigation need (IR) calculation results from an actual experiment.

DETAILED DESCRIPTION OF THE INVENTION

The foregoing summary, as well as the following detailed description of the invention, is better understood when read in conjunction with the appended drawings. For illustrating the invention, exemplary constructions of the invention are shown in the drawings. However, the invention is not limited to the specific components disclosed herein. The description of the component referenced by a numeral in a drawing is applicable to the description of that component shown by that same numeral in any subsequent drawing herein.

Figure 1:
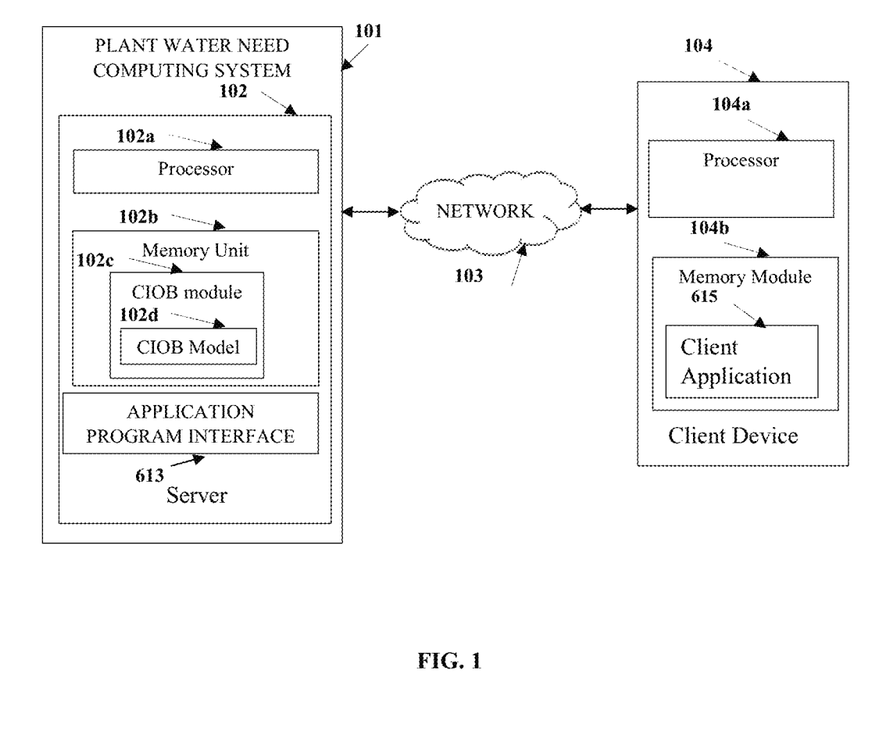
FIG. 1 exemplarily illustrates a plant water need computing system.
Figure 2:
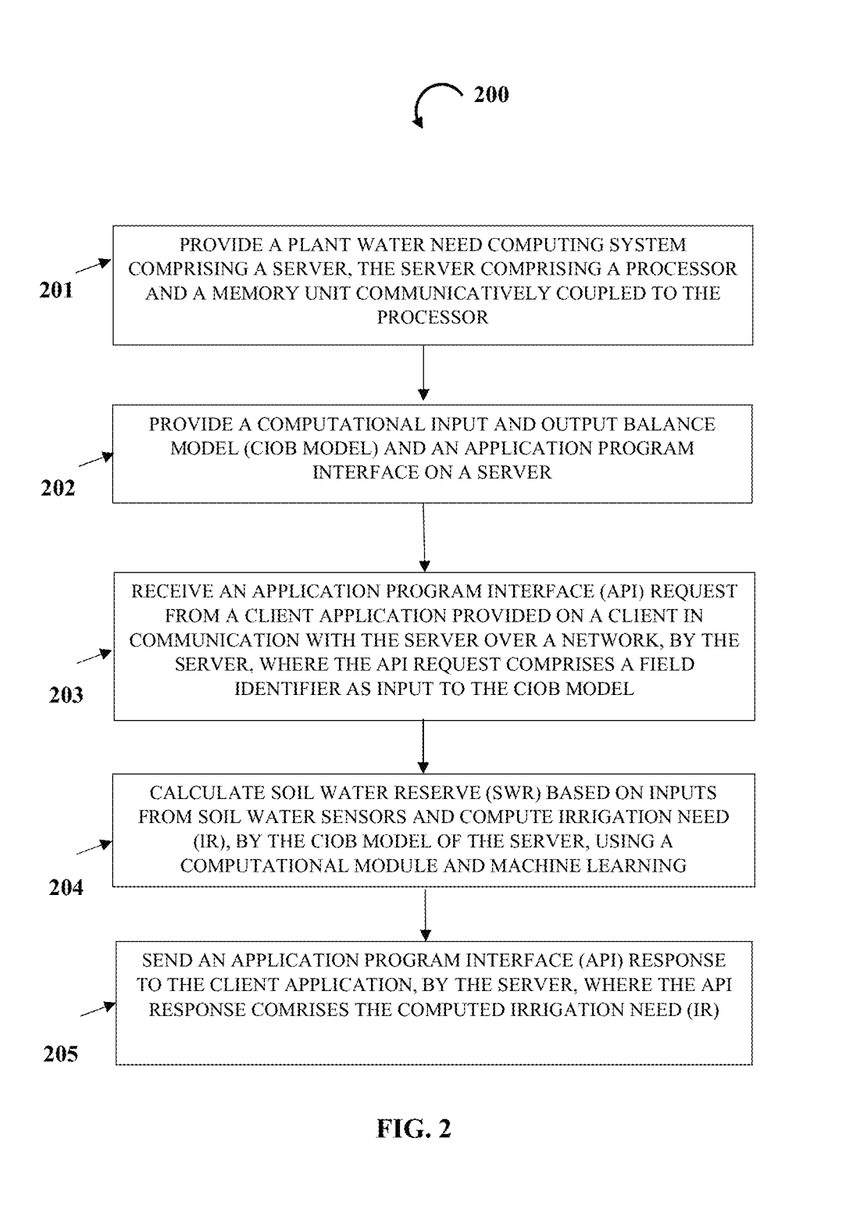
FIG. 2 exemplarily illustrates a method for calculating plant water need.

FIG. 1 exemplarily illustrates a plant water need computing system 101 and FIG. 2 exemplarily illustrates a method 200 for calculating plant water need. The plant water need computing system 101 and method 200 optimize irrigation efficiency while ensuring that a plant grows at optimal water availability. The method and system use a computational input and output balance (CIOB) module 102c implemented on a server 102 to calculate irrigation need (IR) predictively.

Figure 3:
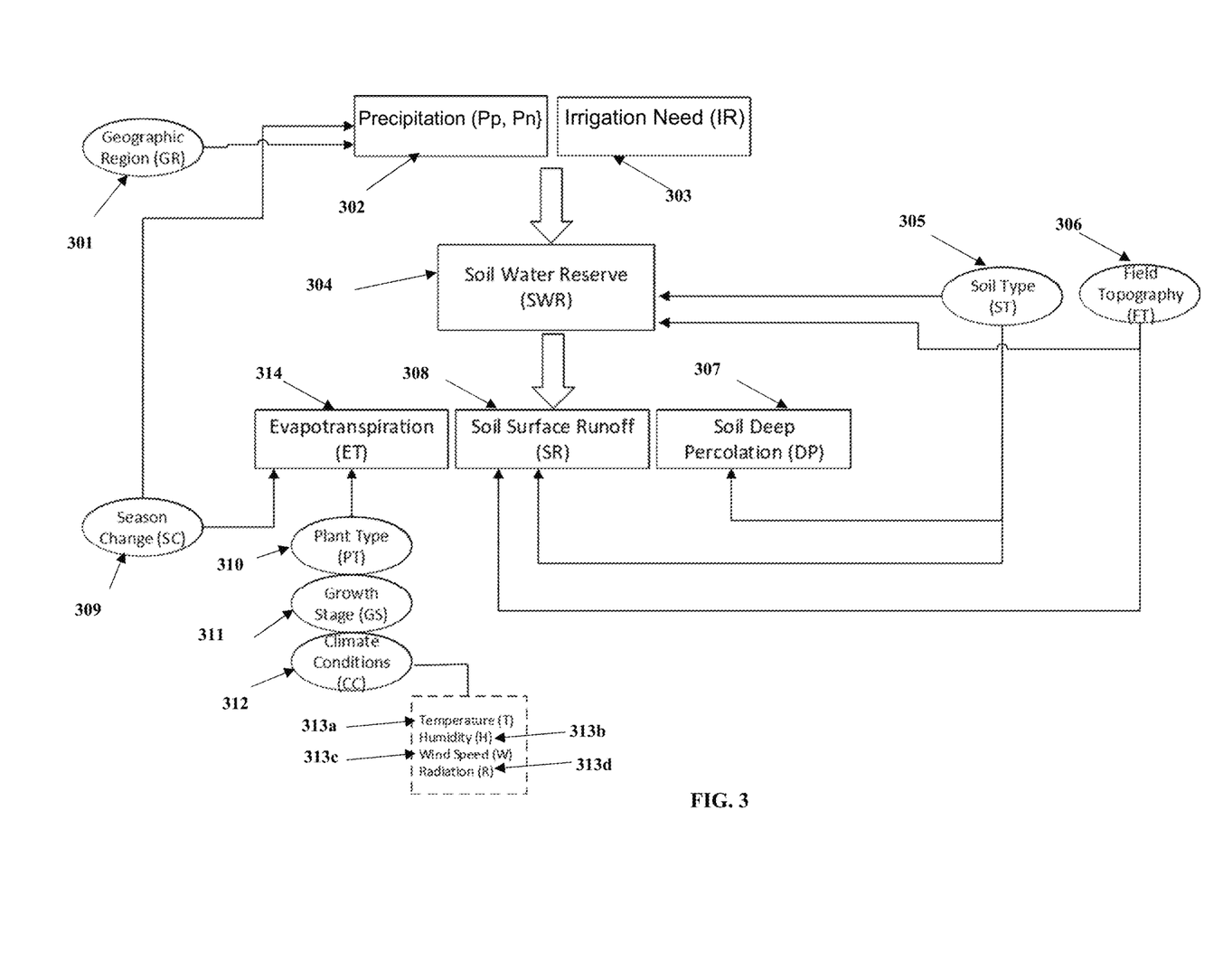
FIG. 3 exemplarily illustrates a flow diagram showing a computational input and output balance model (CIOB model) and variables and affecting factors in the CIOB model.
Figure 6:
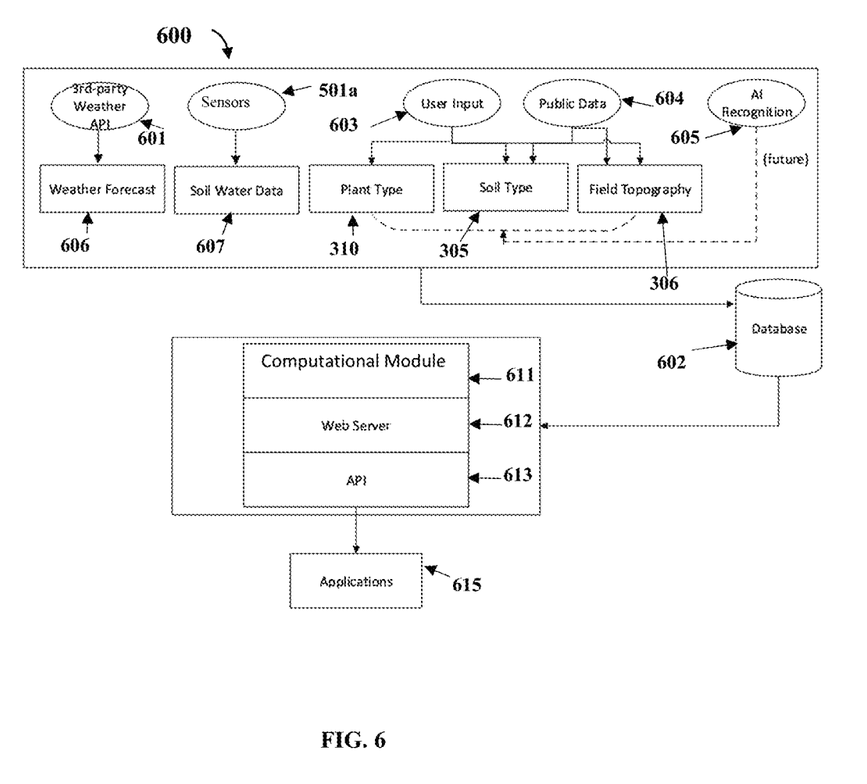
FIG. 6 exemplarily illustrates a block schematic diagram showing system architecture of a server apparatus used for CIOB model implementation.
Figure 7:
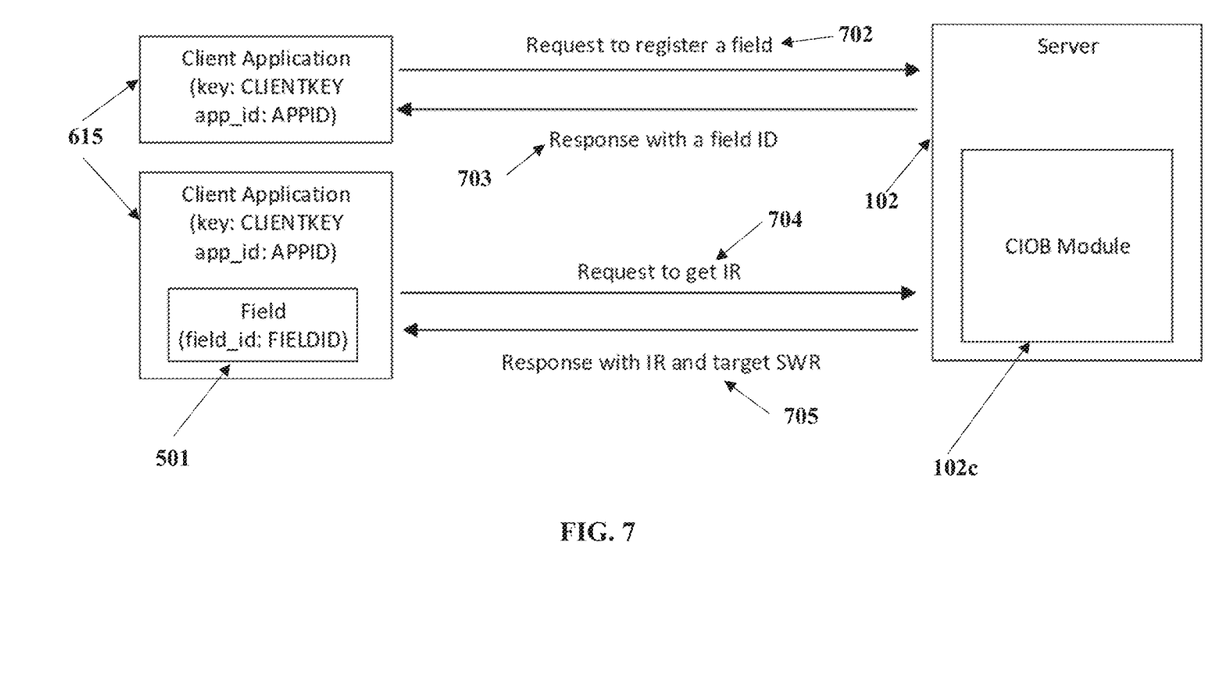
FIG. 7 exemplarily illustrates workflow between a client application on a client device and a server of a plant water need computing system.

The plant water need computing system 101 comprises the server 102. The server 101 comprises a memory unit 102b comprising computer program instructions defined by modules of the plant water need computing system 101. The server 102 further comprises at least one processor 102a communicatively coupled to the memory unit 102b for executing the computer program instructions defined by the modules of the plant water need computing system 101. The modules of the plant water need computing system 101 comprise a computational input and output balance model (CIOB) module 102c. The computational input and output balance model (CIOB) module 102c comprises a computational input and output balance model (CIOB) model 102d. The CIOB model 102d receives field identifier 501 as input from a client application 615, illustrated in FIGS. 5-6, on a client device 104 in an application program interface (API) request 704 as shown in FIG. 7. Precipitation (Pp, Pn) 302, shown in FIG. 3 is water intake in a field water balance equation. The field water balance equation is an equation used to compute Irrigation need (IR) 303. The CIOB model 102d sends an application program interface (API) response 705 to the client application 615. The application program interface (API) response 705 comprises calculated irrigation need (IR) 303.

Figure 5:
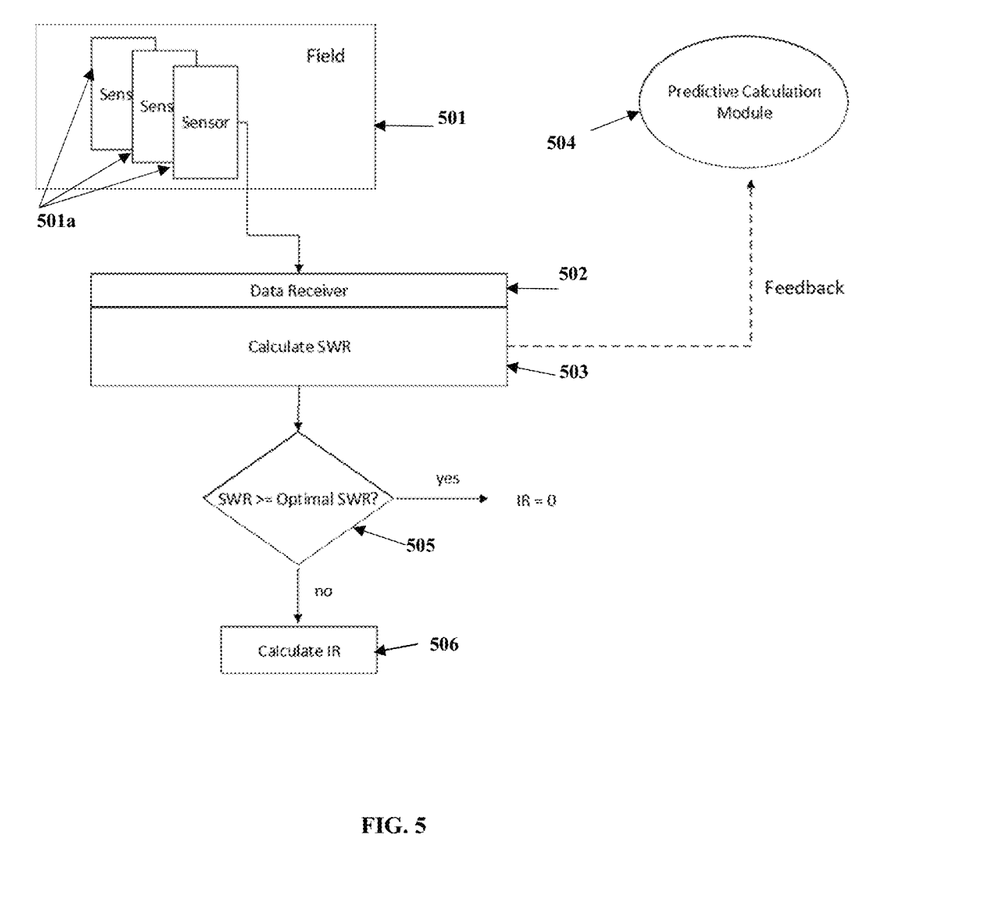
FIG. 5 exemplarily illustrates a flow diagram showing feedback-based irrigation calculation and machine learning by a predictive calculation module.

The plant water need computing system 101 further comprises an application program interface (API) 613 for facilitating an API request and API response between the client application 615 on the client device 104 and the server 102. The client device 104 is in communication with the server 102. The client application 615 on the client device 104 sends an API request 702 to the server 102 to register a field 501 as shown in FIGS. 5 and 7. In response to the API request 702, the server 102 sends an API response 703 comprising a FieldID for the field 501 to the client application 615 on the client device 104. The client application 615 on the client device 104 then sends an API request 704 to the server 102 requesting for the computed irrigation need (IR) 303. In response to the API request 704, the server 102 sends an API response 705 to the client application 615 on the client device 104. The API response 705 comprises the computed irrigation need (IR) 303.

The CIOB model 102d is implemented as a service through a representational state transfer application program interface (REST API). Registered clients are provided access to an application program interface (API) 613, illustrated in FIG. 6, through a client application 615 provided on a client device 104. As used herein, the client device 104 refers to a smart phone, a microcomputer, a single-board computer, etc.

FIG. 3 exemplarily illustrates a flow diagram showing the CIOB model 102d and variables and affecting factors in the CIOB model 102d. The CIOB model 102d uses a computational module 611, exemplarily illustrated in FIG. 6, and machine learning to calculate the irrigation need IR. The machine learning module comprises an artificial intelligence recognition module 605, as shown in FIG. 6, and a predictive calculation module 504, exemplarily illustrated in FIG. 5.

Calculation Method: The variables and affecting factors are distributed into three groups.

The first group comprises factors that are fact-based and do not change over time. The factors in the first group are soil type (ST) 305, field topography (FT) 306, plant type (PT) 310, and geographic region (GR) 301. The information in the first group of factors is retrieved from public data 604 or user input 603, illustrated in FIG. 6.

The second group comprises factors that can be forecasted or calculated. The factors in the second group include precipitation (Pp, Pn) 302, climate conditions (CC) 312 comprising temperature T 313a, humidity H 313b, wind speed W 313c, and radiation R 313d, season change (SC) 309, and growth stage (GS) 311. Weather forecast 606 is used to predict precipitation (Pp, Pn) 302 and climate condition 312. The CIOB model 102d uses a computational module 611 to calculate season change 309 with a small time range. Plant growth stage (GS) 311 is calculated based on plant type 310, soil type 305 and geographic region 301. The factors in the second group build the foundation of predictive irrigation need calculation.

Figure 4:
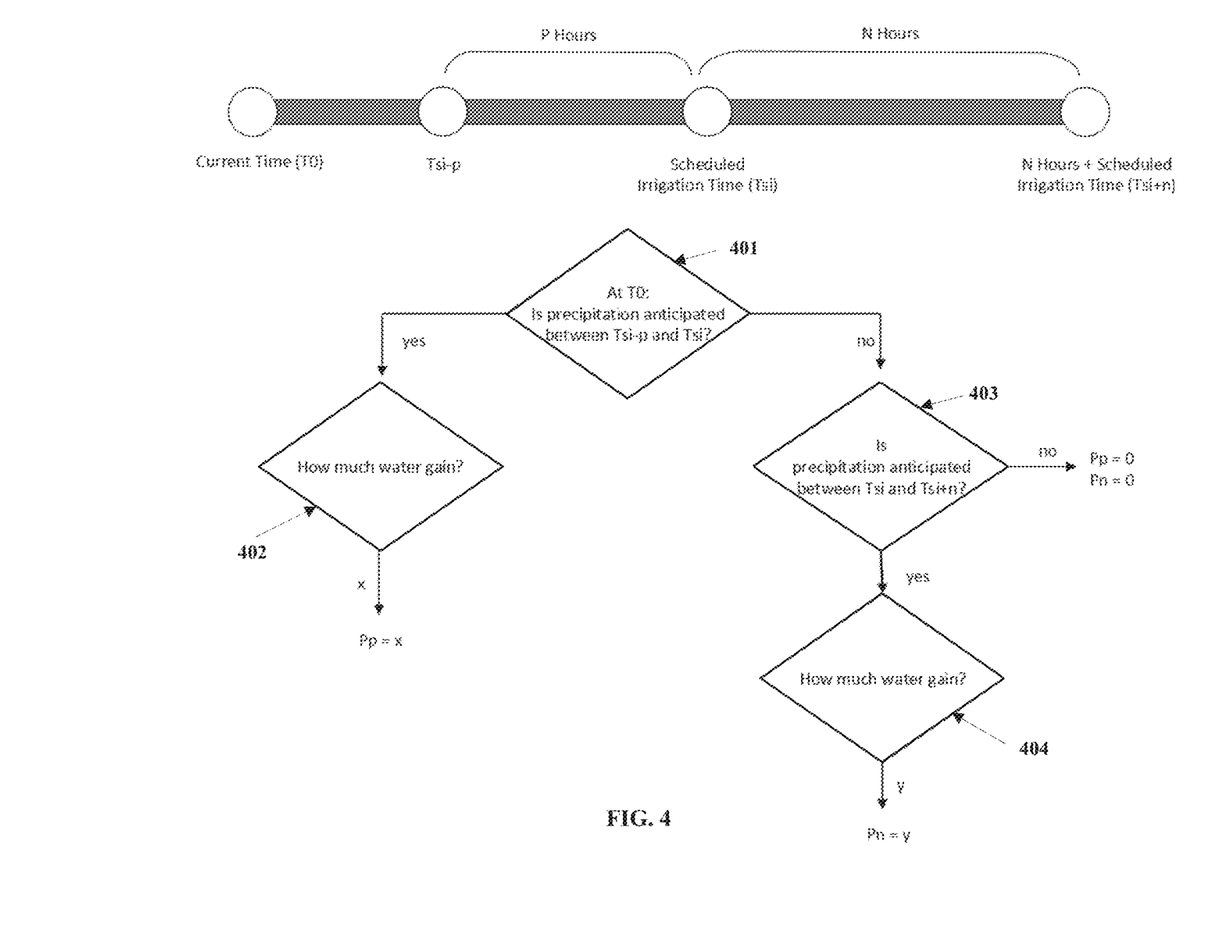
FIG. 4 exemplarily illustrates a flow diagram showing the prediction of precipitation (Pp, Pn), and use of the precipitation (Pp, Pn) in a field water balance equation.

FIG. 4 exemplarily illustrates a flow diagram that predicts precipitation (Pp, Pn) 302 and use of precipitation (Pp, Pn) in a field water balance equation.

Weather forecast data 606 obtained using third party weather application program interface (API) 601 (shown in FIG. 6) comprises information of precipitation (Pp, Pn) 302 and climate condition 312 at a future time. Precipitation forecast is not limited from a current time (T0) to a checkpoint time (Tsi), since there is a possibility of rain before or after the checkpoint time (Tsi). If irrigation is done based on calculation at the checkpoint time (Tsi), and there is rain before or after the calculation at the checkpoint time (Tsi), most of the rain water may runoff from the soil surface. Therefore, the current method comprises precipitation forecast before and after the checkpoint time (Tsi).

At current time $T_0$, the plant water need computing system 101 checks 401 whether precipitation is anticipated between time Tsi-p and Tsi. If the answer is "yes", the plant water need computing system 101 determines 402 amount of water gain. If the amount of water gain is "x", then the plant water need computing system 101 sets Pp=x.

When the plant water need computing system 101 checks 401 whether precipitation is anticipated between time Tsi-p and Tsi, if the answer is "no", then the plant water need computing system 101 checks 403 whether precipitation is anticipated between time Tsi and Tsi+n. If the answer is "no", then the plant water need computing system 101 sets Pp=0 and Pn=0. However, when the plant water need computing system 101 checks 403 whether precipitation is anticipated between time Tsi and Tsi+n, if the answer is "yes", the plant water need computing system 101 determines 404 the amount of water gain. If the amount of water gain is "y", then the plant water need computing system 101 sets Pn=y.

Climate condition 312, for example, temperature 313a, humidity 313b, wind speed 313c, and radiation 313d affects evapotranspiration (ET) rate 314. Water loss by evapotranspiration (ET) 314 between the current time (T0) and the checkpoint time (Tsi) is calculated based on plant type 310, growth stage 311, season change 309, and climate condition 312.

Conventional methods and apparatuses determine the season change 309 based on calendar dates or temperature fluctuation. Conventional methods and apparatuses have the drawback of false answer and provide a wide range of days for the season change 309. In contrast, in the plant water need computing system and method disclosed herein, the season change 309 is calculated based on Chinese solar terms. The Chinese solar terms are based on lunisolar calendar and have been used in China for agricultural activity for over 5000 years. It precisely tells farmers what to do on certain days.

The climate condition 312 affects the evapotranspiration (ET) rate 314 along with plant type (PT) 310, growth stage (GS) 311 and season change (SC) 309. The total evapotranspiration (ET) 314 consumption between the current time (T0) and the checkpoint time (Tsi) is represented as ΣET {T,H,W,R,PT,GS,SC}.

Field topography (FT) 306 and soil type (ST) 305 determine water loss by soil surface runoff (SR) 308 and soil deep percolation (DP) 307. Although the water loss can be calculated by the soil surface runoff 308 and soil deep percolation 307 based on precipitation (Pp, Pn) 302, field 306 and soil 305 data, it is not possible to reclaim the lost water by such a calculation. To minimize the water loss, a computational module 611 based on soil, field, and irrigation settings is used. Furthermore, a machine learning mechanism, comprising an artificial intelligence recognition module 605 and a predictive calculation module 504, is used to learn from past calculations and measured data, and the machine learning data is used to calibrate the calculation parameters and improve accuracy. In most cases, the irrigation water need, calculated by the computational module 611 and using machine learning is at or below the upper limit of field water capacity (FWC) minus soil water reserve (SWR) 304, which minimizes the soil surface runoff (SR) 308 and the soil deep percolation (DP) 307.

If a field is sloped, the soil surface runoff 308 may be significant. The recommendation from the computational module 611 splits irrigation into multiple intervals to reduce the soil surface runoff 308.

The third group of affecting factors affect the field water balance equation. Soil water reserve 304 belongs to this group. The field water balance equation is a set of equations used to compute soil water reserve at intended irrigation time (SWRi) and an irrigation need (IR) 303. The third group of factors are measurable.

FIG. 5 exemplarily illustrates a flow diagram showing feedback-based irrigation calculation and machine learning by a predictive calculation module 504. The plant water need computing system 101 uses a data receiver to receive inputs 502 from the soil water sensors 501a in a field 501. Measurable available water in the soil forms a basis of feedback-based irrigation need calculation of the plant water need computing system and method disclosed herein. The measurement of the actual available water in the soil prevents under-irrigation or over-irrigation as illustrated in FIG. 5. The plant water need computing system 101 calculates 503 soil water reserve based on the inputs from the soil water sensors 501a. A predictive calculation module makes predictive calculation adjustment 504 of parameters by using the feedback as a learning mechanism to improve accuracy.

Architecture. The CIOB model 102d is implemented on a server 102, for example, a dedicated Linux server using Python, MySQL, Apache, JSON, XML etc.

Variables and affecting factors in the irrigation calculation formula are retrieved from the third-party application program interface (API) 601 or from sensors 501a in a field at real time, or pre-configured from user input 603 and/or public data 604. Several of the variables and the affecting factors are also calculated based on the pre-configured data, such as growth stage (GS) 311, and season change (SC) 309.

The retrieved and the calculated data, i.e., variables and affecting factors, are stored in a database 602.

The plant water need computing system 101 checks 505 whether the calculated soil water reserve is greater than or equal to an optimal value of soil water reserve. If the answer is "yes" then the plant water need computing system 101 concludes that irrigation need (IR)=0. When the calculated soil water reserve is less than the optimal value of soil water reserve, the plant water need computing system 101 calculates 506 the irrigation need by the formula:

$$IR=SWRi-SWRp-Pp-Pn+ET+SR+DP$$

where IR is water need at the intended irrigation time, SWRi is the soil water reserve 304 at the scheduled irrigation time Tsi, SWRp is the soil water reserve P hours before the scheduled irrigation time Tsi, Pp is precipitation P hours before the scheduled irrigation time Tsi, Pn is the precipitation N hours after the scheduled irrigation time, ET is the plant evapotranspiration rate 314 between current time T0 and the scheduled irrigation time Tsi, SR is water runoff from the soil surface 308 between the current time T0 and the scheduled irrigation time Tsi, and DP is the soil deep percolation 307 between the current time T0 and the scheduled irrigation time Tsi.

The computational module 611 processes the retrieved data and the calculated data and generates decisions on the irrigation need of the plant. The computational module 611 passes the decisions to a client device 104 through application program interface (API) calls from the client device 104. The client device 104 is, for example, a smart phone and an irrigation device. A client application 615 is loaded on the client device 104 for interaction with the server 102.

FIG. 6 exemplarily illustrates a block schematic diagram showing an architecture 400 of a server 102 used for implementing a CIOB model 102d.

Application Program Interface (API) 613.

The CIOB model 102d is implemented on the server 102 as a service through a representational state transfer application program interface (REST API). The application program interface (API) 613 answers questions such as, for example "How much water does my plant need?", "How much water does my field need in the next 24 hours?"

Registered clients are provided access to the application program interface (API) 613. The plant and field information can be configured in an account, or they can be passed in an application program interface (API) request 702. The application program interface (API) response 703 includes irrigation recommendation. Clients can use this mechanism to develop their own applications and devices.

API 613

Register a Field 501

A client will register and create a client application 615 on the server 102 using a client device 104. It will call an API 613 to create a field 501 for the application. The API call 702 creating a field 501 passes geometric information of the field 501 (address or longitude and latitude) and plant information growing in the field (plant type 310, growth stage 311), and optionally the boundaries of the field. The API response 703 comprises the field identifier (FID) 501. There are a set of APIs to set the field information, for example, the information of the irrigation system in the field.

A sample API response that returns the field identifier 501 is shown below:

{
  "metadata": null;

```
       "data": {
          "field_id": 526718
       }
       "error": null
    }
```

Request 704 Irrigation Need (IR) of a Field 501.

A client application 615 calls the API 613 to request 704 irrigation need of a field 501. It passes the field identifier 501 and target watering time. Optionally it passes the current soil water reserve (SWR) 304. The API 613 responds 705 with irrigation need (IR) and soil water reserve (SWR) post irrigation at the target time. Both IR and SWR are in unit of millimeter (mm) by default. If the information of the irrigation system in the field 501 is provided when registering the field 501, the API request 704 from the client can specify return type of IR to be irrigation time.

A sample API request and response for returning the irrigation need (IR) 303 is shown below:

```
    {
      "metadata": null;
      "data": {
        "irrigation_water": 2.5,
        "ir_type": volume,
        "target_swr": 6.7,
        "unit": metric,
        "target_time": 1625763600
      }
      "error": null
    }
```

Client Application 615

With the method 200 of computing plant irrigation need (IR) using the adaptive CIOB model 102*d* being served as a service, third parties can rely on this service to develop their own applications and devices to manage irrigation needs in their fields 501. Applications and devices built upon CIOB model service have these benefits:
1. Save expensive development cost, avoid insufficient optimization due to technical limitations, and save expensive infrastructure cost.
2. Optimal watering to avoid wasting of water.
3. Optimal watering to improve yield and quality.
4. Calculate water need for plants quantitively.
5. CIOB model 102*d* is an approach to represent the environment from comprehensive dimensions. Therefore, the irrigation need calculation is closest to the plant's natural need, and the approach provides the resources that the CIOB model 102*d* can learn from the environment and self-adjust the computation.

The server 102 illustrated in FIG. 1 is, for example, a Linux server using Python, MySQL, Apache, JSON, XML etc. The client device 104 is, for example, a smart phone or an irrigation device. The network 103 is, for example, an internet, an intranet, a wireless network, a communication network that implements Bluetooth® of Bluetooth Sig, Inc., a network that implements Wi-Fi® of the Wireless Ethernet Compatibility Alliance, Inc., an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, an internet connection network, an infrared communication network, etc., or a network formed from any combination of these networks.

FIG. 2 exemplarily illustrates a method 200 for calculating plant water need. The plant water need is herein referred to as irrigation need (IR) 303. The method 200 comprises providing 201 a plant water need computing system 101 comprising a server 102. The server 102 comprises a processor 102*a* and a memory unit 102*b* communicatively coupled to the processor 102*a*. The memory unit 102*b* comprises computer program instructions defined by modules of the plant water need computing system 101. The modules of the plant water need computing system 101 comprise a computational input and output balance (CIOB) module 102*c* comprising a computational input and output balance model 102*d*. The CIOB model 102*d* is configured to calculate irrigation need (IR) predictively.

The CIOB model 102*d* is implemented as a service through a representational state transfer application program interface (REST API). Registered clients are provided access to an application program interface (API) 613 provided 201 in the server 102, via a client application 615 provided 202 on a client device 104. The server 102 and the client device 104 communicate with each other over a network 103. The CIOB model 102*d* of the server 102 receives 203 a field identifier 501 as input from a client application 613 installed on a client device 104 via an API request 704. The CIOB model 102 calculates IR by using a computational module 611 and machine learning. A machine learning module comprising an artificial intelligence recognition module 605 and a predictive calculation module 504 is used for machine learning, which assists to make predictive calculation adjustment of parameters to improve accuracy. The CIOB model 102*d* sends 205 an API response 705 to the client application 615 on the client device 104. The API response 705 comprises irrigation need (IR).

In comparison with a conventional method and apparatus, the method and system disclosed herein using the CIOB model 102*d* offers the following advantages:
(a) The comprehensive computation and forecast model reflects the influencing factors including plant type 310, soil type 305, geographic location 301, field topography 306, climate condition 312, and season change 309.
(b) Built-in machine learning 504, 605 to self-improve calculation and quality of forecast.
(c) Accurate mechanism to determine season change 309.
(d) Data library (plant type 310 data, soil type 305 data, field topography 306 data, weather data 606) that supports intelligent recognition of field 501 and plant characteristics, and learning.

FIG. 7 exemplarily illustrates workflow between a client application 615 on a client device 104 and a server 102 of a plant water need computing system 101. The plant water need computing system 101 comprises an application program interface (API) 613, shown in FIGS. 1 and 6, for facilitating an API request and API response between the client application 615 on the client device 104 and the server 102. The client device 104 is in communication with the server 102. The client application 615 on the client device 104 sends an API request 702 to the server 102 to register a field as shown in FIG. 7. In response to the API request 702, the server 102 sends an API response 703 comprising a FieldID for the field 501 to the client application 615 on the client device 104. The client application 615 on the client device 104 then sends an API request 704 to the server 102 requesting for the computed irrigation need (IR) 303. In response to the API request 704, the server 102 sends an API response 705 to the client application 615 on the client device 104. The API response 705 comprises the computed irrigation need (IR) 303.

FIG. 8 exemplarily illustrates experimental data showing irrigation need (IR) calculation results from an actual experiment.

The foregoing examples have been provided merely for explanation and are in no way to be construed as limiting of the method and the apparatus for calculating plant water need disclosed herein. While the method and the apparatus for calculating plant water need has been described with reference to a particular embodiment, it is understood that the words, which have been used herein, are words of description and illustration, rather than words of limitation. Furthermore, although the method and the apparatus for calculating plant water need has been described herein with reference to a particular means, materials, and embodiment, the method and the apparatus for calculating plant water need is not intended to be limited to the particulars disclosed herein; rather, the design and functionality of the method and the apparatus for calculating plant water need extends to all functionally equivalent structures and uses, within the scope of the appended claims. Furthermore, it will be understood by those skilled in the art, having the benefit of the teachings of this specification, that the method and the apparatus for calculating plant water need disclosed herein is capable of modifications and other embodiments may be effected and changes may be made thereto, without departing from the scope and spirit of the method and the apparatus for calculating plant water need disclosed herein.

We claim:

1. A plant water need computing system for predictive calculation of plant water need, comprising:
a server, the server comprising:
a memory unit comprising computer program instructions defined by modules of the plant water need computing system;
at least one processor communicatively coupled to the memory unit for executing the computer program instructions defined by the modules of the plant water need computing system, the modules of the plant water need computing system comprising:
a computational input and output balance (CIOB) module comprising a computational input and output balance model (CIOB model), wherein said CIOB receives field identifier as input from a client application on a client device in an application program interface (API) request, wherein said CIOB model sends an application program interface (API) response to said client application, wherein said application program interface (API) response comprises calculated irrigation need (IR); and
an application program interface (API) for receiving said application program interface (API) request from said client application on said client device in communication with said server apparatus, wherein said application program interface (API) sends said application program interface (API) response to said client application on said client device, and wherein said application program interface (API) response comprises said computed irrigation need (IR).

2. The plant water need computing system of claim 1, wherein said CIOB model uses a computational module and machine learning to calculate soil water reserve (SWR) and said irrigation need (IR).

3. The plant water need computing system of claim 1, wherein said server is a Linux server using one of Python, MySQL, Apache, JSON, and XML.

4. The plant water need computing system of claim 1, wherein said computational input and output balance model (CIOB model) is implemented on said server as a service through a Representational State Transfer Application Program Interface (REST API).

5. The plant water need computing system of claim 1, wherein said soil water reserve at said scheduled irrigation time Tsi (SWRi), and said soil water reserve P hours before said scheduled irrigation time Tsi (SWRp) are calculated based on inputs from soil water sensors.

6. The plant water need computing system of claim 5, wherein predictive irrigation need (IR) is calculated by the formula:

$$IR = SWRi - SWRp - Pp - Pn + ET + SR + DP$$

wherein irrigation need is water need at a scheduled irrigation time, said Pp is said precipitation P hours before said scheduled irrigation time Tsi, said Pn is said precipitation P hours after said scheduled irrigation time Tsi, said ET is said plant evapotranspiration rate between said current time T0 and said scheduled irrigation time Tsi, wherein said SR is water runoff from said soil surface between said current time T0 and said scheduled irrigation time Tsi, and said DP is said deep percolation between said current time T0 and said scheduled irrigation time Tsi.

7. The plant water need computing system of claim 6, wherein Evapotranspiration (ET), surface runoff (SR) and deep percolation (DP) are variables representing water output in the CIOB model.

8. The plant water need computing system of claim 7, wherein said variables and affecting factors for computing said soil water reserve and said irrigation need comprise:
a first group of affecting factors comprising one or more of soil type (ST), field topography (FT), plant type (PT), and geographic region (GR), wherein said first group of affecting factors are one or more of retrieved from public data or obtained from user input;
a second group of affecting factors comprising one or more of climatic condition (CC), season change (SC), and growth stage (GS), wherein said second group also includes said variables comprising said precipitation (Pp, Pn), wherein weather forecast is used to predict said precipitation (Pp, Pn) and said climate condition, and wherein said CIOB model uses a computational algorithm to calculate said season change and said plant growth stage based on said plant type, said soil type (ST), and said geographic region (GR), and wherein said second group forms a foundation of predictive irrigation need calculation; and
a third group of affecting factors comprising soil water reserve (SWR), wherein a soil water sensor is used to measure available water in soil, wherein said measurable available water in said soil forms a basis of feedback-based irrigation need calculation, wherein said measurement of said actual available water in said soil prevents under-irrigation or over-irrigation, and wherein feedback serves as a learning mechanism to make predictive calculation adjustment of irrigation parameters to improve accuracy.

9. The plant water need computing system of claim 8, wherein said climate condition (CC) comprises one or more of temperature (T), humidity (H), wind speed (W), and radiation R.

10. The plant water need computing system of claim 8, wherein said season change is calculated based on Chinese solar terms.

11. The plant water need computing system of claim 8, wherein said climate condition (CC) affects said Evapotranspiration (ET) rate along with said plant type (PT), said growth stage (GS) and said season change (SC), and wherein said total Evapotranspiration (ET) consumption between said current time and said checkpoint time is represented as $\Sigma$ ET $\{T,H,W,R,PT,GS,SC\}$.

12. The plant water need computing system of claim 1, wherein water loss is calculated using surface runoff (SR) and deep percolation (DP) based on precipitation (Pp, Pn), field data, and soil data, wherein complex algorithms based on soil, field, and irrigation settings are used to minimize said water loss, wherein a machine learning mechanism is used to learn from past calculations and measured data to calibrate calculation parameters and improve accuracy, wherein said irrigation need (IR) calculated by said computational module is at or below upper limit of field water capacity (FC) minus soil water reserve (SWR), which minimizes said soil surface runoff (SR) and said deep percolation (DP).

13. The plant water need computing system of claim 6, wherein variables and affecting factors in said irrigation need calculation formula are (i) retrieved from a third-party application program interface (API) or from sensors in a field in real time, (ii) pre-configured from user input and/or public data, and (iii) calculated based on pre-configured data comprising growth stage (GS), and season change (SC), wherein said retrieved, said pre-configured, and said calculated data is stored in a database.

14. A method for predictive calculation of plant water need, comprising:
   providing a plant water need computing system comprising a server, the server comprising a processor and a memory unit communicatively coupled to the processor, wherein the memory unit comprises computer program instructions defined by modules of the plant water need system, the modules of the plant water need system comprising:
   a computational input and output balance (CIOB) module comprising a computational input and output balance model (CIOB model), wherein said CIOB model receives field identifier as input from a client application on a client device in an application program interface (API) request, wherein said CIOB model sends an application program interface (API) response to said client application, wherein said application program interface (API) response comprises calculated irrigation need (IR), and wherein said CIOB model uses a computational algorithm and machine learning to calculate said irrigation need (IR); and
   an application program interface (API) for receiving said application program interface (API) request from said client application on said client in communication with said server, wherein said application program interface (API) sends said application program interface (API) response to said client application on said client, and wherein said API response comprises said computed irrigation need (IR);
   calculating soil water reserve at said scheduled irrigation time Tsi (SWRi), and said soil water reserve P hours before said scheduled irrigation time Tsi (SWRp) are calculated based on inputs from soil water sensors;
   calculating predictive irrigation need (IR) using said server by formula:

$$IR=SWRi-SWRp-Pp-Pn+ET+SR+DP$$

wherein irrigation need is water need at said scheduled irrigation time, said Pp is said precipitation P hours before said scheduled irrigation time Tsi, said Pn is said precipitation P hours after said scheduled irrigation time Tsi, said ET is said plant evapotranspiration rate between said current time T0 and said scheduled irrigation time Tsi, wherein said SR is water runoff from said soil surface between said current time T0 and said scheduled irrigation time Tsi, and said DP is said deep percolation between said current time T0 and said scheduled irrigation time Tsi.

15. The method of claim 14, wherein said CIOB model uses a computational module and machine learning to calculate said irrigation need (IR).

16. The method of claim 14, wherein said server is a Linux server using one of Python, MySQL, Apache, JSON, and XML.

17. The method of claim 14, wherein said computational input and output balance model (CIOB model) is implemented on said server as a service through a Representational State Transfer Application Program Interface (REST API).

18. The method of claim 14, wherein said Evapotranspiration (ET), said surface runoff (SR) and deep percolation (DP) are variables representing water output in the CIOB model.

19. The method of claim 18, wherein said variables and affecting factors for computing said soil water reserve and said irrigation need comprise:
   a first group of affecting factors comprising one or more of soil type (ST), field topography (FT), plant type (PT), and geographic region (GR), wherein said first group of affecting factors are one or more of retrieved from public data or obtained from user input;
   a second group of affecting factors comprising one or more of climatic condition (CC), season change (SC), and growth stage (GS), wherein said second group also includes said variables comprising said precipitation (Pp, Pn), wherein weather forecast is used to predict said precipitation (Pp, Pn) and said climate condition, and wherein said CIOB model uses a computational algorithm to calculate said season change and said plant growth stage based on said plant type, said soil type (ST), and said geographic region (GR), and wherein said second group forms a foundation of predictive irrigation need calculation; and
   a third group of affecting factors comprising soil water reserve (SWR), wherein a soil water sensor is used to measure available water in soil, wherein said measurable available water in said soil forms a basis of feedback-based irrigation need calculation, wherein said measurement of said actual available water in said soil prevents under-irrigation or over-irrigation, and wherein feedback serves as a learning mechanism to make predictive calculation adjustment of irrigation parameters to improve accuracy.

20. The method of claim 19, wherein said climate condition (CC) comprises one or more of temperature (T), humidity (H), wind speed (W), and radiation R.

21. The method of claim 19, wherein said season change is calculated based on Chinese solar terms.

22. The method of claim 19, wherein said climate condition (CC) affects said Evapotranspiration (ET) rate along with said plant type (PT), said growth stage (GS) and said season change (SC), and wherein said total Evapotranspiration (ET) consumption between said current time and said checkpoint time is represented as Σ ET {T,H,W,R,PT,GS,SC}.

23. The method of claim 14, wherein water loss is calculated using said surface runoff (SR) and said deep percolation (DP) based on said precipitation (Pp, Pn), said field data, and said soil data, wherein a computational module based on soil, field, and irrigation settings is used to minimize said water loss, wherein a machine learning mechanism is used to learn from past calculations and measured data to calibrate calculation parameters and improve accuracy, wherein said irrigation need (IR) calculated by said computational module is at or below upper limit of field water capacity (FC) minus soil water reserve (SWR), which minimizes said soil surface runoff (SR) and said deep percolation (DP).

24. The method of claim 14, wherein variables and affecting factors in said irrigation need calculation formula are (i) retrieved from a third-party application program interface (API) or from sensors in a field in real time, (ii) pre-configured from user input and/or public data, and (iii) calculated based on pre-configured data comprising growth stage (GS), and season change (SC), wherein said retrieved, said pre-configured, and said calculated data is stored in a database.

25. A process for optimizing the irrigation water need of a plant, comprising:

providing a server with a computational input and output balance model (CIOB model);

calculating soil water reserve at said scheduled irrigation time Tsi (SWRi), and said soil water reserve P hours before said scheduled irrigation time Tsi (SWRp) are calculated based on inputs from soil water sensors;

calculating irrigation need using said computational input and output balance model (CIOB model) in said server by formula:

$$IR = SWRi - SWRp - Pp - Pn + ET + SR + DP$$

wherein IR is water need at said scheduled irrigation time, wherein said Pp is said precipitation P hours before said scheduled irrigation time Tsi, wherein said Pn is said precipitation P hours after said scheduled irrigation time Tsi, wherein said ET is said plant evapotranspiration rate between said current time T0 and said scheduled irrigation time Tsi, wherein said SR is water runoff from said soil surface between said current time T0 and said scheduled irrigation time Tsi, and wherein said DP is said deep percolation between said current time T0 and said scheduled irrigation time Tsi; and optimizing said plant water need of said plant using a machine learning mechanism in said server to learn from past calculations and use learning data to calibrate calculation parameters and improve accuracy, wherein said irrigation need (IR) calculated by a computational module of said server is at or below upper limit of field water capacity (FC) minus soil water reserve (SWR), which minimizes said soil surface runoff (SR) and said deep percolation (DP).

\* \* \* \* \*